A. C. GILLAM.
WHEEL.
APPLICATION FILED AUG. 12, 1908.
936,994.
Patented Oct. 12, 1909.
2 SHEETS—SHEET 1.
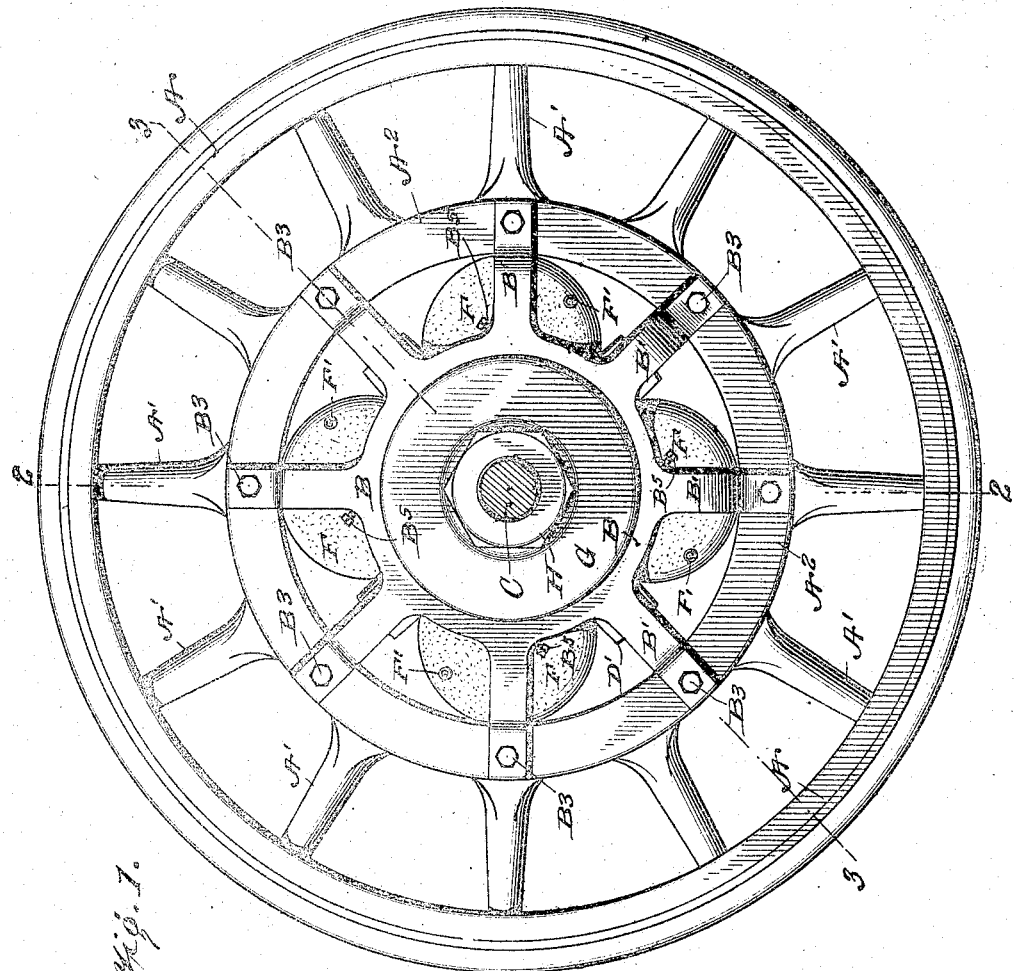
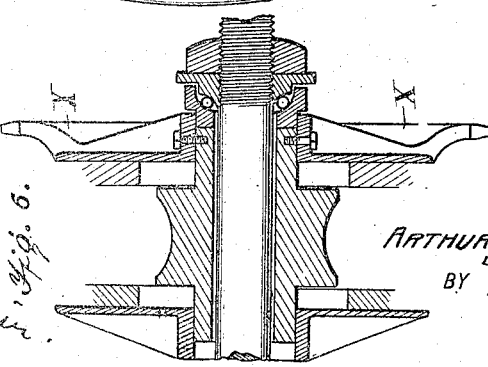
WITNESSES
INVENTOR
ARTHUR C. GILLAM,
BY
ATTORNEYS

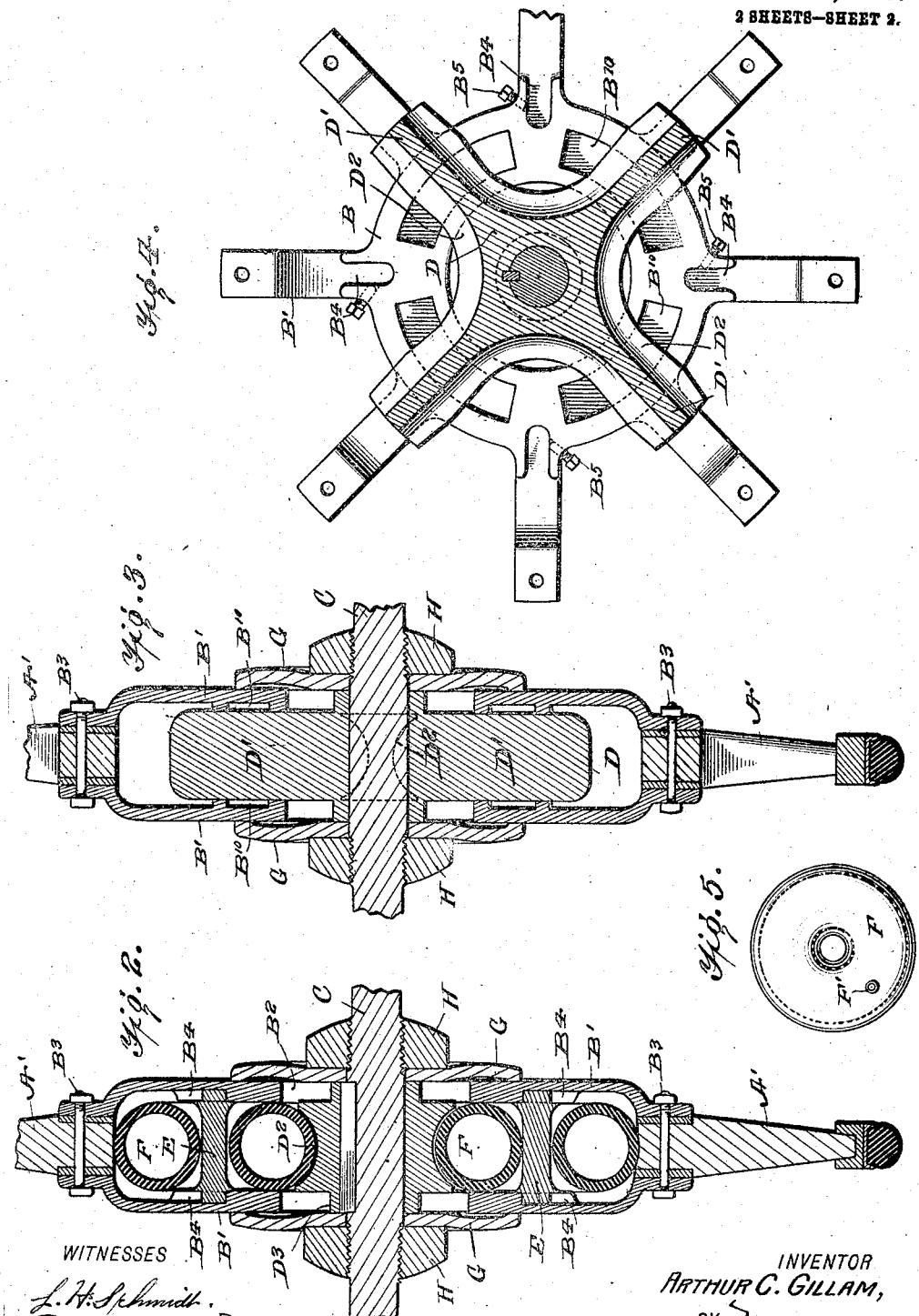

UNITED STATES PATENT OFFICE.

ARTHUR CALDWELL GILLAM, OF HICKSVILLE, OHIO.

WHEEL.

936,994.　　　Specification of Letters Patent.　　Patented Oct. 12, 1909.

Application filed August 12, 1908. Serial No. 448,147.

*To all whom it may concern:*

Be it known that I, ARTHUR C. GILLAM, a citizen of the United States, and a resident of Hicksville, Defiance county, State of Ohio, have invented certain new and useful Improvements in Wheels, of which the following is a specification.

This invention is an improvement in wheels and has for an object to provide a pneumatic wheel with a punctureless tire; and the invention consists in certain novel constructions and combinations of parts as will be hereinafter described and claimed.

In the drawings—Figure 1 is a side view of a wheel embodying my invention. Fig. 2 is a sectional view on about line 2—2 of Fig. 1. Fig. 3 is a sectional view on about line 3—3 of Fig. 1. Fig. 4 is a detail cross section drawn through the axle section and showing the same and the axle in section, and showing the inner face of the armed plate in elevation. Fig. 5 is a detail side view of one of the annular pneumatic tubes, and Fig. 6 is a detail transverse section showing a sprocket wheel.

In carrying out my invention I provide a rim A, which may be supplied with any suitable form of tire, either solid rubber as shown, steel or otherwise as desired, and this rim A is carried by the spokes A' from an inner ring A², which is bolted at B³ to the outer ends of the arms B', of what for convenience of reference I term the body plates B. These plates B, of which I use two, are provided with the central opening B² which surrounds the axle and is of sufficient size to permit the desired movement of the body of the wheel across the axle in securing the pneumatic action. The plates B have a suitable number of arms B', and in the illustration shown I employ eight of these arms, and they are bolted at B³ to the ring A² as shown. On the axle C I key the axle plate D, which is provided with arms D'. One-half in number of the arms B' of the plate B intermediate the arms D' of the plate D are preferably grooved radially in their inner faces at B⁴ to receive the ends of the spools E and permit the said spools to move radially in the operation of the invention.

The plate D is grooved at D² with the grooves extending to the outer ends of the arms D', and said grooves are formed in their body portions approximately concentric with the grooves B⁴, and receive the annular pneumatic tubes F, which may be supplied with suitable valves F" and encircle their respective spools E as will be understood from Figs. 1, 2 and 5 of the drawings.
Side plates G are secured by nuts H on the axle C, and the said plates G are pressed securely against the ends of the hub D³ of the axle plate D, said plates G overlapping at their outer ends the inner edges of the body plates B of the wheel, and tending to maintain the wheel in vertical position. Said side plates G are flared out, or channeled out at their inner faces, so as to leave a circumferential narrow inner frictional surface bearing against the body plate. This greatly reduces the friction between the two parts.

In operation it will be noticed that the annular pneumatic tubes are protected from injury being housed in by the ring A², and the body plates B and are subject only to pressure strain and not to frictional wear. This permits me to make the air chambers of the pneumatic cushioning tubes relatively large, it being understood that these tubes may be made of any suitable material, such for instance, as is now commonly employed in the production of pneumatic tires. The grooving of the body and arms of the axle plate D to receive cushion tubes F forms a seat for the said tubes and aids in preserving them in position and reduces the danger of injury to said tubes in the use of the wheel.

The rotation of the outer portion of the wheel from the axle is accomplished through the arms of the axle plate acting upon the pneumatic tubes and through the said tubes upon the spools E, and thence to the rim portion of the wheel, as will be readily understood from Figs. 1 and 2 of the drawings. The inflated tubes maintain the spools in the wheel and the deflation of the tubes will permit the removal of the same and their respective spools from between the arms or spokes of the body plates D for repairs or substitution of new tubes as may be necessary. When the tube is deflated this allows the spool to rise out of the grooves at the ends thereof and the deflated tube and its spool may then be withdrawn through the space between the spoke previously carrying said tube and spool and the adjacent spoke. After the tube and spool are removed from the wheel the old deflated tube may be removed from the spool and a new deflated tube placed on the spool, and the spool and new tube be then pushed through the space between the arms of the body plate into the space between the body plates and the spool be settled into the grooves for the ends thereof, and the new tube be inflated thus retaining the spool in the grooves, at the same time allowing a radial movement of the entire spool giving great resilience. The free space around the pneumatic tubes allows them to assume an elliptical or ovoid shape when such radial displacement of the spool is prevented.

It will be understood that with the construction shown, the outer or rim housing of the wheel might be rotated with only one of the tubes inflated and possibly with all of the tubes deflated so that it is not probable that the wheel can be put out of service even should all of the pneumatic tubes be deflated, but the said tubes when inflated in connection with the spools traveling in the radial grooves B⁴ give a high degree of resiliency, and the grooves B⁴ permit the replacing of the tubes without taking the wheel apart. Manifestly with all the pneumatic tubes deflated the wheel no longer operates as a spring wheel, but it will be understood that this deflation of the tubes does not put the wheel entirely out of commission, but the construction as shown permits the vehicle to continue its journey without a total break down. This is aided by the operation of the set screws B⁵, which may be tightened to fasten the spools firmly in their grooves and thus prevent the spools from falling out when all of the tubes are deflated. The tubes being of small size, extra ones can be easily carried.

The axle plate may be made of aluminum or other suitable material, and the body plate and rim plates may also be made of any suitable metal and in about the proportions shown or other suitable proportions as may be found desirable in designing the wheels for practical use.

In Fig. 4 the body plates B are shown channeled at B¹⁰, this being for the purpose of decreasing the weight.

By the described construction, it will be noticed that in operation the movement of the rim portion of the wheel is synchronous with that of the axle and the wheel when used on self propelling vehicles is well adapted to the shaft driven type. Manifestly, however, the circular supporting side plates might be fastened to the axle plate and the latter be freely revolved around the axle, and sprocket wheels be applied to the side plates to permit the application of power to a wheel revolving about the axle without departing from some of the principles of my invention. When so constructed ball bearing devices as shown in Fig. 6 may be employed. In this construction, the balls run in a suitable race, and a sprocket wheel X is provided.

I claim—

1. The wheel substantially as herein described comprising a central or axle plate portion having radial arms and grooved along its body portion and said arms, body plates on opposite sides of the central plate and having arms alternating with those of the central plate and provided in their inner faces midway between the ends of the arms and the central plate with radial grooves, a rim portion carried by the arms of the body plates, spools fitting at their ends in the grooves of the body plates, annular pneumatic tubes encircling the said spools and fitting in the grooves of the central plate and bearing between the same and the rim portion of the wheel, and side plates overlapping at their outer edges the inner edges of the body plates, all substantially as and for the purposes set forth.

2. The combination in a wheel with a rim portion and body plates supporting the same, of spools carried by the body plates and movable radially with respect thereto, a central or axle plate between the body plates, and annular pneumatic tubes encircling their respective spools and lying between the body plates and bearing between the central or axle plate and the rim portion of the wheel for supporting the latter, substantially as set forth.

3. In a wheel substantially as described, the combination of a rim portion, a central or axle portion, body plates on opposite sides of the central portion, annular pneumatic tubes bearing between the central portion and the rim portion, and spools within said tubes and radially movable relatively to the body portion, substantially as set forth.

4. The combination in a wheel, with a rim portion, and body plates supporting the same, of spools carried by the body plates, the latter having in their inner faces recesses forming seats in which the ends of the spools are removably held by inflated tubes, and annular pneumatic tubes encircling their respective spools and lying between the body plates and adapted when inflated to maintain the spool ends in the recesses or seats therefor, and when deflated to permit the removal of said spools with the deflated tubes, substantially as set forth.

ARTHUR CALDWELL GILLAM.

Witnesses:
C. E. TYLER,
C. P. CHESTER.